(12) United States Patent
Sobel et al.

(10) Patent No.: US 7,730,533 B1
(45) Date of Patent: Jun. 1, 2010

(54) CACHE HINT CORRECTION FOR SECURITY SCANNING

(75) Inventors: William E. Sobel, Stevenson Ranch, CA (US); Mark Spiegel, West Hills, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1230 days.

(21) Appl. No.: 11/282,539

(22) Filed: Nov. 18, 2005

(51) Int. Cl.
  *G06F 11/30* (2006.01)
  *G06F 11/00* (2006.01)
(52) U.S. Cl. .......................................... 726/22; 713/188
(58) Field of Classification Search ................... 726/24; 713/188
  See application file for complete search history.

(56) References Cited

U.S. PATENT DOCUMENTS 6,721,847 B2 * 4/2004 Hursey ........................ 711/118

OTHER PUBLICATIONS

"File System Filter Drivers," Microsoft Windows, Microsoft Corporation, 2005 [online] [Retrieved on Oct. 11, 2005] Retrieved from the Internet<URL:http:www.microsoft.com/whdc/driver/filterdrv/default.mspx>.
"File System Minifilter Load Order Groups and Altitude Ranges," Microsoft Windows, Microsoft Corporation, Updated Jul. 30, 2004 [online] [Retrieved on Oct. 11, 2005] Retrieved from the Internet<URL:http://www.microsoft.com/whdc/driver/filterdrv/altrange.mspx>.

* cited by examiner

*Primary Examiner*—Christopher J Brown
(74) *Attorney, Agent, or Firm*—Fenwick & West LLP (57) ABSTRACT

A computer includes a filter module providing a standardized interface for intercepting file access requests. The computer also includes a cache manager that manages the caching mode used with the requests. An application on the computer issues a file access request and explicitly or implicitly specifies a cache hint informing the cache manager of a desired caching mode. A security scanner module scans files on the computer for malicious software. The security scanner module intercepts a file access request and alters the caching mode, if necessary, to one optimized for security scanning. The security scanner module performs the file scan using the optimal caching mode, and, if necessary, resets the caching mode to its original state.

19 Claims, 6 Drawing Sheets

CACHE HINT CORRECTION FOR SECURITY SCANNING

BACKGROUND OF THE INVENTION

1. Field of the Invention

This invention pertains in general to software for detecting viruses and other malicious software and in particular to techniques for scanning a computer file for the presence of the malicious software.

2. Description of the Related Art

Caching is a well-known technology for optimizing access to data stored by a computer. Typically, a computer uses a relatively large yet slow memory device for long term storage of data. Examples of slow memories include hard drives, CD-ROMs, and DVDs. Additionally, the computer uses a relatively small yet fast memory for short term storage of data. An example of such a fast memory is the computer's random access memory (RAM). Caching accelerates the operation of the computer by anticipating which data in the slow memory will be used by the computer, and moving those data to the fast memory before they are needed.

Modern file systems include a cache manager that performs file caching for processes executing on the computer. The cache manager identifies the files and/or parts of the files that are likely to be accessed by a process, and loads those files or portions into a fast memory in anticipation of the process's request for access. The NTFS and WinFS file systems from MICROSOFT CORP. of Redmond, Wash. are examples of operating systems having cache managers.

To facilitate selection of the correct caching strategy, file systems allow a process to specify a "cache hint" when requesting access to a file. The cache hint indicates the manner in which the process expects to access the data. For example, a process can use a cache hint to specify whether it is reading a file sequentially. The cache manager receives the hint and uses it to select a caching mode that is optimized for the expected data accesses.

Antivirus and other types of security scanners scan files on a computer's storage device to detect the presence of viruses and/or other malicious software. In most instances, a security scanner scans all files of certain types accessed by other processes executing on the computer. This scanning allows the security scanner to proactively detect malicious software and quarantine or remove it before the software has a chance to perform malicious actions.

One way that a security scanner implements its scanning is by intercepting file access requests from other processes. Under this technique, however, the caching mode for the file is based on the cache hint in the original file access request, and is not necessarily the mode that is optimal for security scanning. The use of a suboptimal caching mode can make the scanning process inefficient, which is undesirable because security scanning is performed frequently and even minor inefficiencies can have an impact on the overall performance of the computer. Therefore, there is a need in the art to use the optimal caching mode when a security scanner is scanning a file for the presence of malicious software.

BRIEF SUMMARY OF THE INVENTION

The above need is met by a security scanner module that determines the caching mode associated with a file access request and changes the caching mode, if necessary, to the mode that is optimal for security scanning.

A computer includes a filter module providing a standardized interface for intercepting file access requests. The computer also includes a cache manager that manages the caching mode used with the requests. An application on the computer issues a file access request that explicitly or implicitly specifies a cache hint informing the cache manager of a desired caching mode.

A security scanner module scans files on the computer for malicious software. The security scanner module intercepts a file access request and determines the caching mode associated with it. If the caching mode is not optimal for security scanning, the security scanner module changes the caching mode to the optimal one by, for example, changing the cache hint in the file access request or altering data structures maintained by the cache manager. The security scanner module performs the file scan using the optimal caching mode, and, if necessary, resets the caching mode to its original state.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
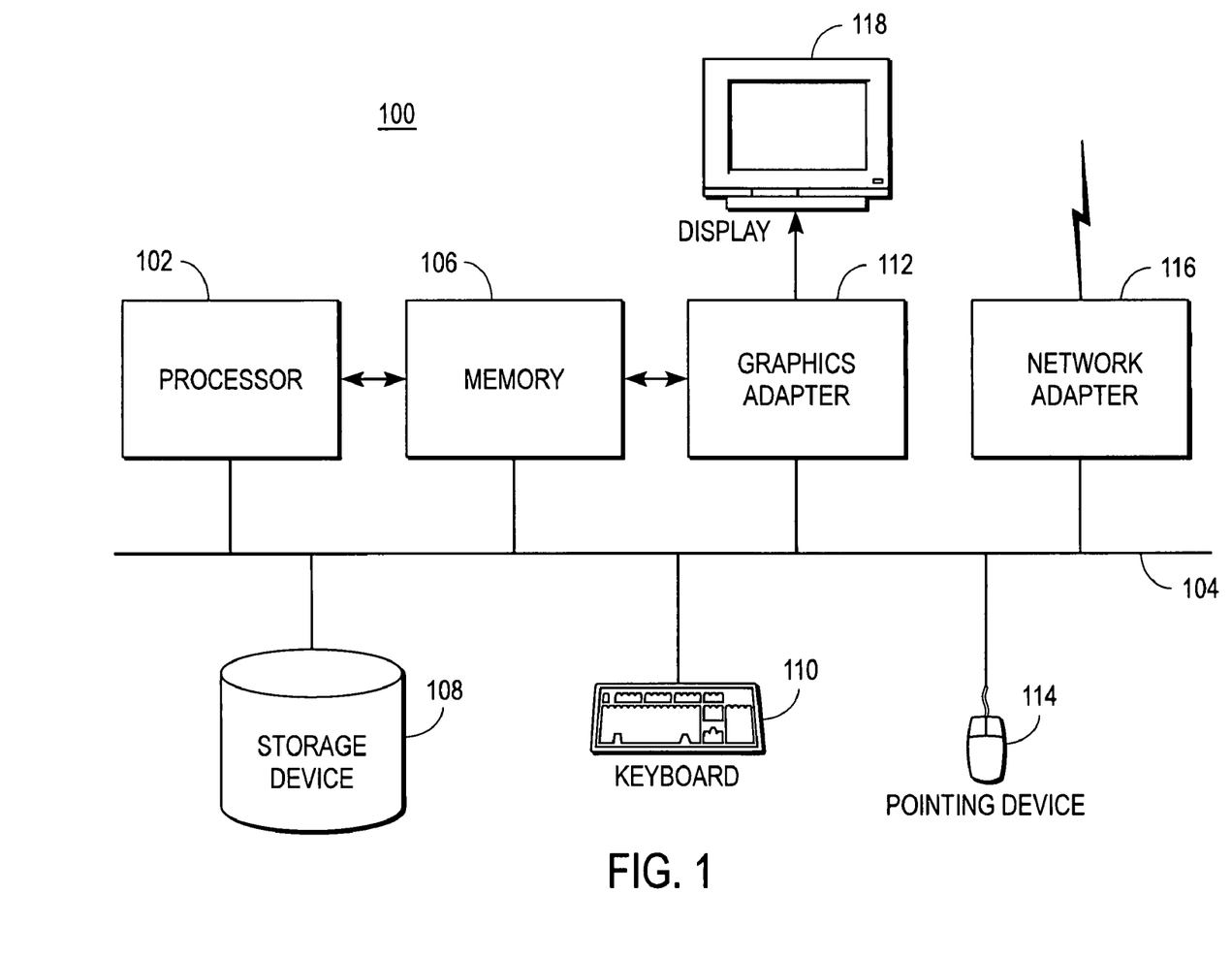
FIG. 1 is a high-level block diagram illustrating a computer for performing security scanning using an optimal caching mode according to one embodiment.

FIG. 1 is a high-level block diagram illustrating a computer 100 for performing security scanning using an optimal caching mode according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. The storage device 108 is a device such as a hard drive, CD or DVD drive, flash memory device, and/or other relatively slow data store and holds files containing executable code and/or data utilized during the operation of the computer 100. The memory 106, in contrast, includes a relatively fast memory store such as a random access memory (RAM) and holds instructions and data loaded from the storage device 108, generated during processing, and/or from other sources.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

In one embodiment, the computer 100 executes an operating system such as a variant of MICROSOFT WINDOWS or LINUX. The operating system controls the operation of the computer 100. In general, the operating system executes one or more application programs. In addition, the computer 100 executes a file system, such as NTFS or WinFS from MICROSOFT Corp. for WINDOWS-based computers and/or ext2 for LINUX-based computers. The file system controls the storage device 108 and provides an interface through which programs executed by the operating system can access data stored therein. Depending upon the embodiment, the file system can be integrated into the operating system or a discrete entity.

The operating system, file system, and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Figure 2:
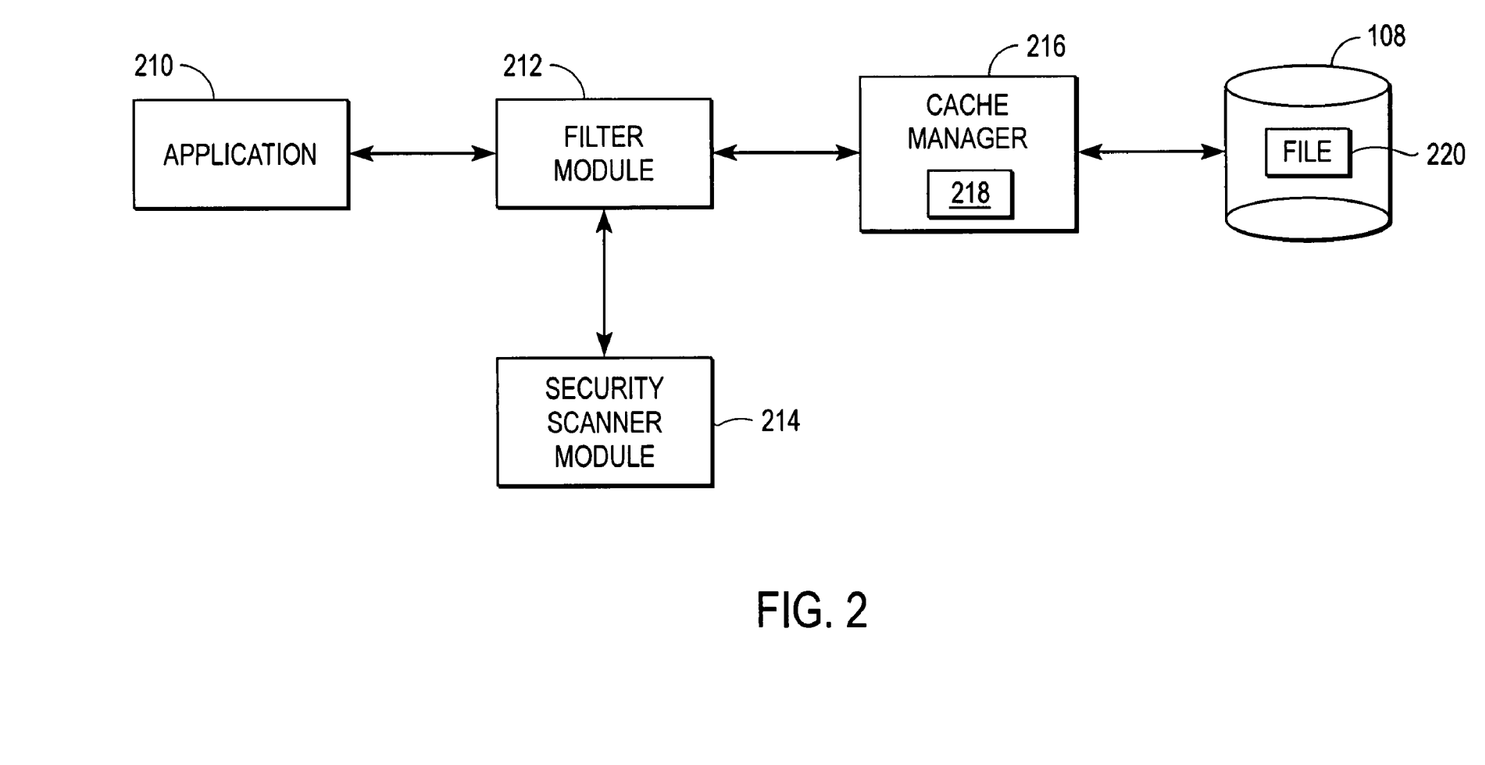
FIG. 2 is a high-level block diagram illustrating logical entities within the computer of FIG. 1 according to one embodiment.

FIG. 2 is a high-level block diagram illustrating logical entities within the computer 100 of FIG. 1 according to one embodiment. Other embodiments can have different and/or additional entities. FIG. 2 illustrates arrows between the entities to represent certain logical communication pathways. However, in some embodiments the entities can communicate using pathways not shown in the figure.

An application 210 is executed under control of the operating system. During its execution, the application 210 occasionally issues requests to access files stored on the storage device 108. The actual content of the request depends upon the operating system and/or file systems in use, but typical requests identify the file by its name and location, and specify the type of access (e.g., read or write access) desired by the application 210. The operating and/or file system generates an identifier called a "file handle" in response to the request from the application 210. The application 210, operating system, file system, and other entities on the computer 100 can utilize the file handle to reference the file. In addition, other file handle instances can be used to access the same file. For purposes of this description, the term "file access request" refers to the initial request from the application 210 and/or the file handle generated in response thereto.

In one embodiment, the file access request also contains a cache hint. The cache hint describes the way in which the application 210 expects to access the file. For example, the cache hint can indicate that the application 210 will access the file in a random fashion, that it will access the file in a sequential fashion, or that the application requests that no caching be performed. For example, the MICROSOFT WINDOWS application programming interface (API) includes a CreateFile( ) call where the calling application 210 can supply a hint parameter having the value FILE_FLAG_RANDOM_ACCESS or FILE_FLAG_SEQUENTIAL_SCAN to respectively indicate that the application will access the file randomly or sequentially.

In one embodiment, file access requests from applications 210 are intercepted by a filter module 212. The filter module 212 can redirect the request to another module executing on the computer 100, and thereby extend or replace functionality provided by the file system. In one embodiment, the filter module 212 is the filter manager provided by MICROSOFT CORP. Software developers can create minifilter drivers that integrate into the filter manager and register to intercept specified types of file access requests. The filter manager uses assigned "altitudes" to determine the relative priorities of multiple minifilter drivers, and thus provides a standardized interface for intercepting file access requests.

The minifilter drivers can register to intercept the requests at different points along the requests' processing. For example, a minifilter driver can register to intercept file access requests before the requests are passed to other modules in the file system. Likewise, a driver can register to intercept a file handle returned by the file system in response to a request from an application. In other embodiments, the functionality of the filter module 212 is provided by other modules provided by MICROSOFT and/or other entities.

A cache manager module 216 receives file access requests targeted at the file system and selects a caching mode for the access. As mentioned above, the file access request will often contain a cache hint specifying how the application expects to access the file. The cache hint thus implicitly specifies the caching mode preferred by the application. If a cache hint is absent, the cache manager module 216 may use a default value instead. In one embodiment, possible caching modes the cache manager module 216 can use include "random," "sequential," "write through" (do not cache writes to the file), and "no buffering" (no caching at all). The cache manager 216 will typically attempt to use the caching mode specified by the cache hint, although other constraints may force it to select a different caching mode.

For purposes of this description, assume that the cache manager module 216 includes functionality for generating file handles in response to received file access requests. The cache manager module 216 associates a selected caching mode with each file handle. All accesses to a file that use a particular file handle will use the caching mode that is associated with it. The cache manager module 216 utilizes a set of data structures 218 to store and maintain the associations between file handles and caching modes. In other embodiments, other modules within the operating and/or file system may generate the file handles.

FIG. 2 also illustrates the storage device 108 and a file 220 within it. As mentioned above, the storage device 108 is a hard drive or other device capable of holding executable code and data. The file 220 is a logical construct on the storage device 108 that holds a discrete amount of code and/or data. Applications and other processes executing on the computer system 100 access the file 220 using a file handle.

A security scanner module 214 registers with the filter module 212 to intercept certain types of file access requests received by the filter module 212. The security scanner module 214 contains functionality for scanning a file 220 on the storage device 108 to detect malicious software contained therein. In one embodiment, the security scanner module 214 determines the caching mode associated with a file access request and determines whether the caching mode is the one best-suited to the security scanning. If the caching mode is not optimal, the security scanner module 214 changes the caching mode to the optimal one. In one embodiment, the best caching mode for security scanning is one optimized for random access. In other embodiments, other caching modes may be better-suited to security scanning. Once security scanning completes, the security scanner module 214 returns the caching mode to the one originally associated with the file access request.

Figure 3:
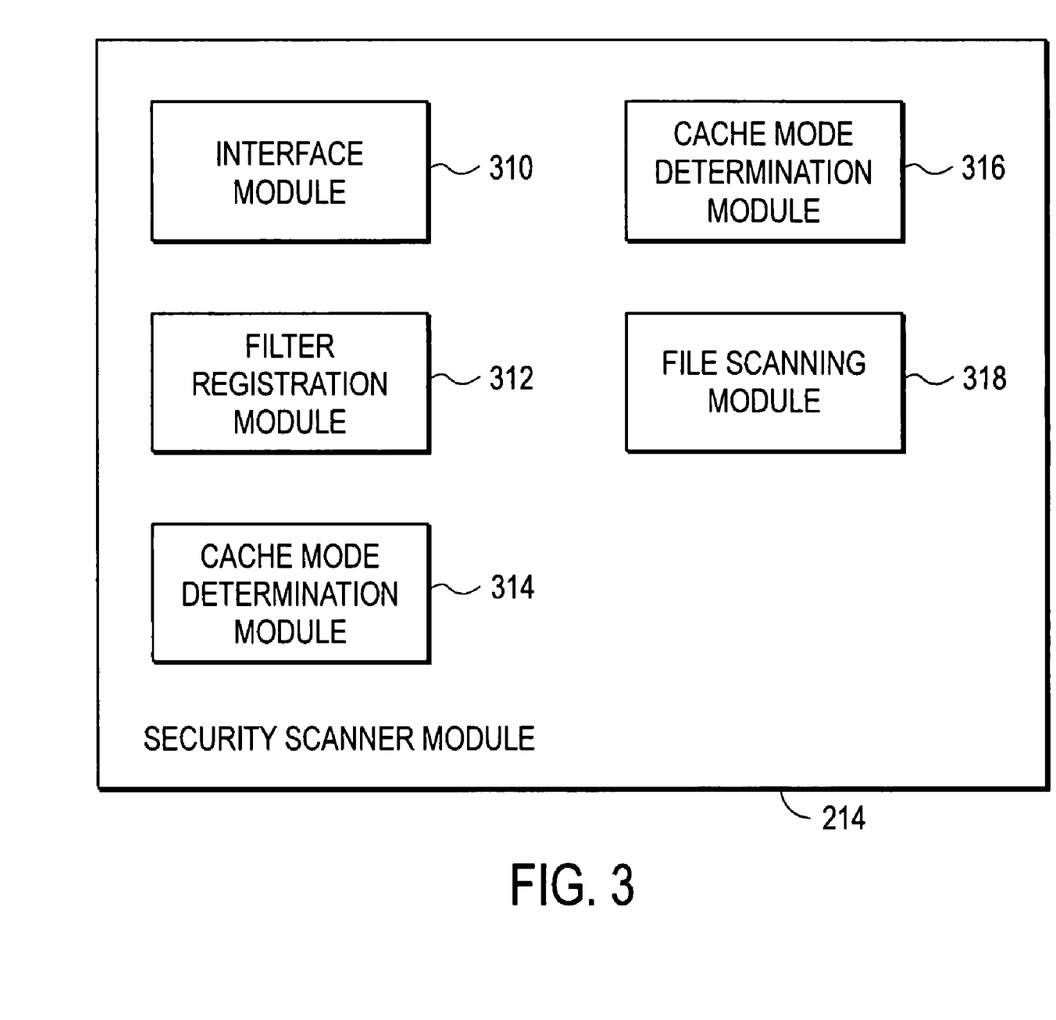
FIG. 3 is a high-level block diagram illustrating modules within the security scanner module according to one embodiment.

FIG. 3 is a high-level block diagram illustrating modules within the security scanner module 214 according to one embodiment. Other embodiments can have different and/or additional modules. Moreover, the functionalities can be distributed among the modules in a manner different than is described herein.

An interface module 310 interfaces with the other logical and/or physical entities within the computer 100, such as the entities illustrated by FIG. 2. To this end, the interface module 310 is adapted to communicate with the filter module 212 to receive intercepted file access requests, including requests from applications 210 and file handles returned by the cache manager 216. In addition, the interface module 310 is adapted to communicate with the cache manager 216 and the storage device 108.

A filter registration module 312 registers with the filter module 212 to intercept certain file accesses. In an embodiment where the filter module 212 is the filter manager from MICROSOFT CORP., the filter registration module 312 includes a filter minidriver that is registered with the filter manager at a Microsoft-assigned altitude. In one embodiment, the filter minidriver is registered within an altitude region specifically provided to antivirus and other security software. Being registered at this altitude allows the filter registration module 312 to intercept requests and file handles ahead of the majority of other entities in the computer 100 that might register with the filter module 212.

A caching mode determination module 314 determines a caching mode associated with a file access request. For an intercepted file access request from an application 210, an embodiment of the caching mode determination module 314 identifies the value of the cache hint parameter (if any) contained therein. For example, the caching mode determination module 314 can determine that the cache hint parameter contains the value FILE_FLAG_SEQUENTIAL_SCAN.

For an intercepted file handle, an embodiment of the caching mode determination module 314 examines the file handle to determine the associated caching mode. If the caching mode is not apparent from the file handle, an embodiment of the caching mode determination module 314 queries the cache manager 216 using public and/or private interfaces to determine the caching mode. For example, the cache determination module 314 can examine the data structures 218 maintained by the cache manager 216 to determine caching modes. In another embodiment, the cache determination module 314 determines the caching mode associated with a file handle through other techniques, such as by performing a set of file accesses to test the caching behavior associated with the file handle.

A caching mode alteration module 316 temporarily alters the caching mode associated with a file access request. In one embodiment, the caching mode alteration module 316 alters the caching mode associated with a file access request by changing the value of the cache hint parameter within the request. For example, if a file access request contains the hint FILE_FLAG_SEQUENTIAL_SCAN, the module can replace this value with FILE_FLAG_RANDOM_ACCESS. In one embodiment, the caching mode alteration module 316 alters the caching mode associated with a file handle by manipulating the data structures 218 maintained by the cache manager 216.

A file scanning module 318 scans a file identified by a file handle and determines whether the file contains malicious software. Examples of malicious software include viruses, worms, Trojan horses, spyware, and adware. If the file scanning module 318 detects malicious software, it can perform a variety of actions such as cleaning the infected file, quarantining the file, and/or reporting the existence of the malicious software to the end-user. In one embodiment, the file scanning module 318 is NORTON ANTIVIRUS from SYMANTEC CORP. of Cupertino, Calif.

Figure 4:
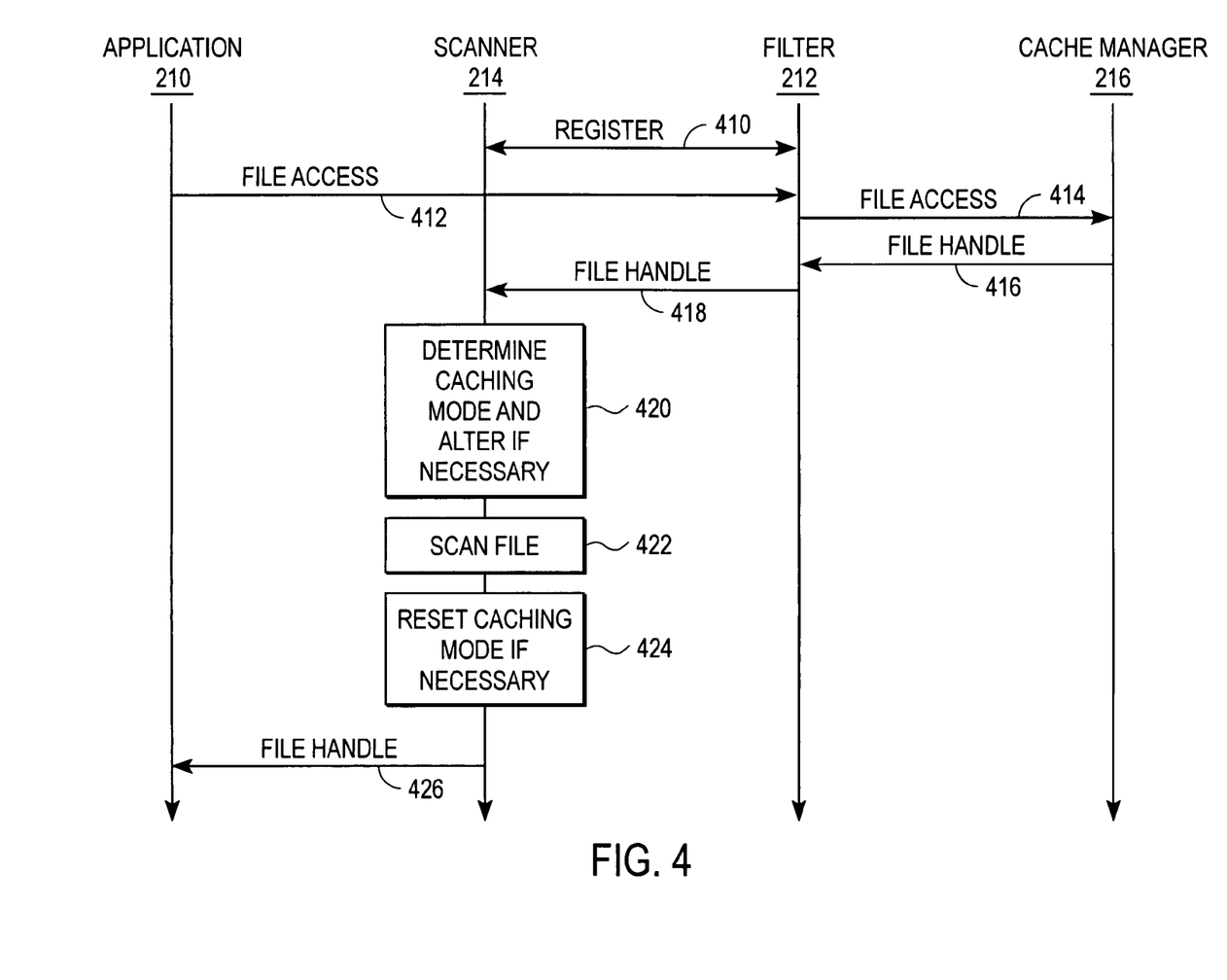
FIGS. 4-6 are ladder diagrams illustrating interactions between an application, security scanner module, filter module, and cache manager according to one embodiment.
Figure 5:
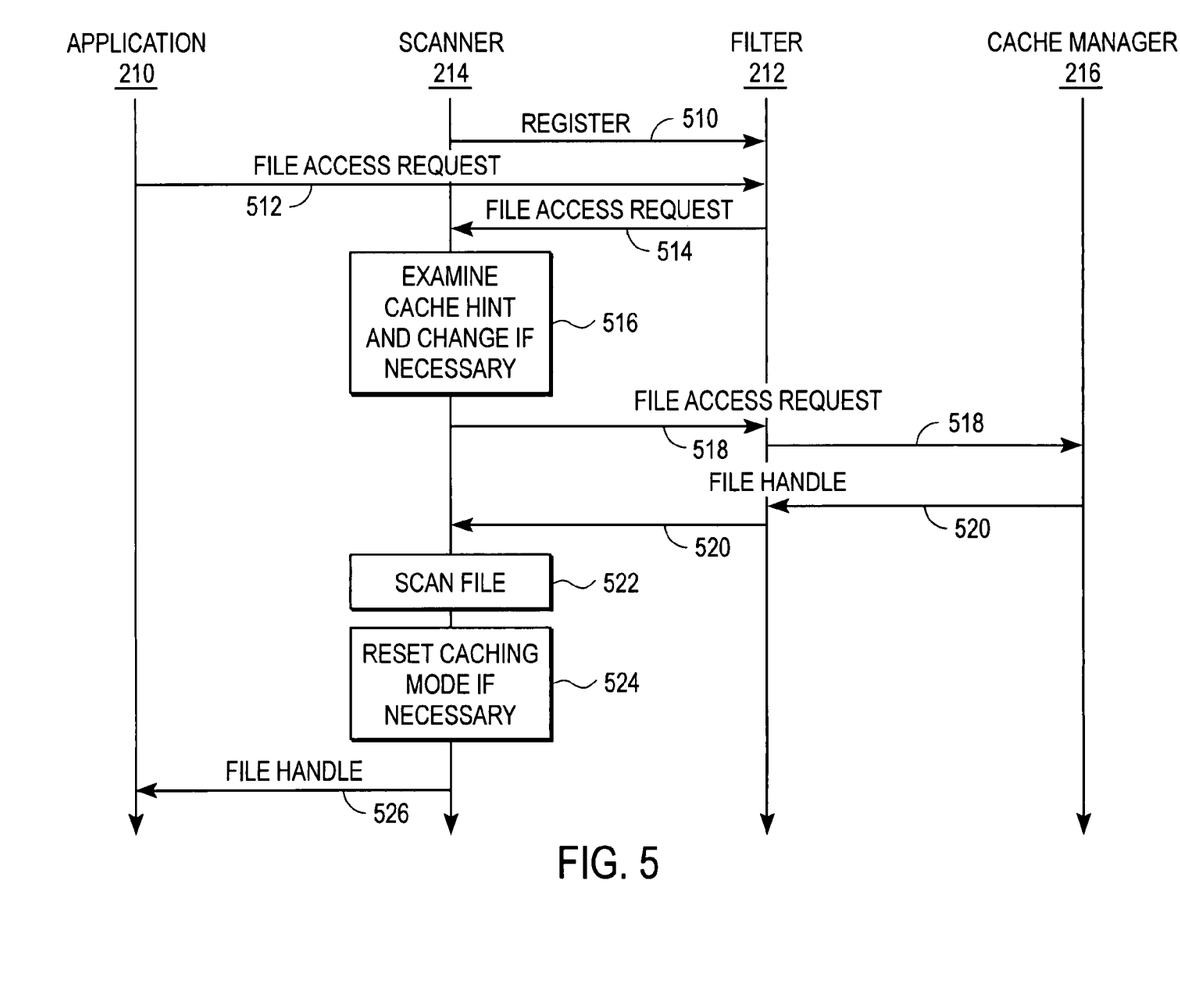
Figure 6:
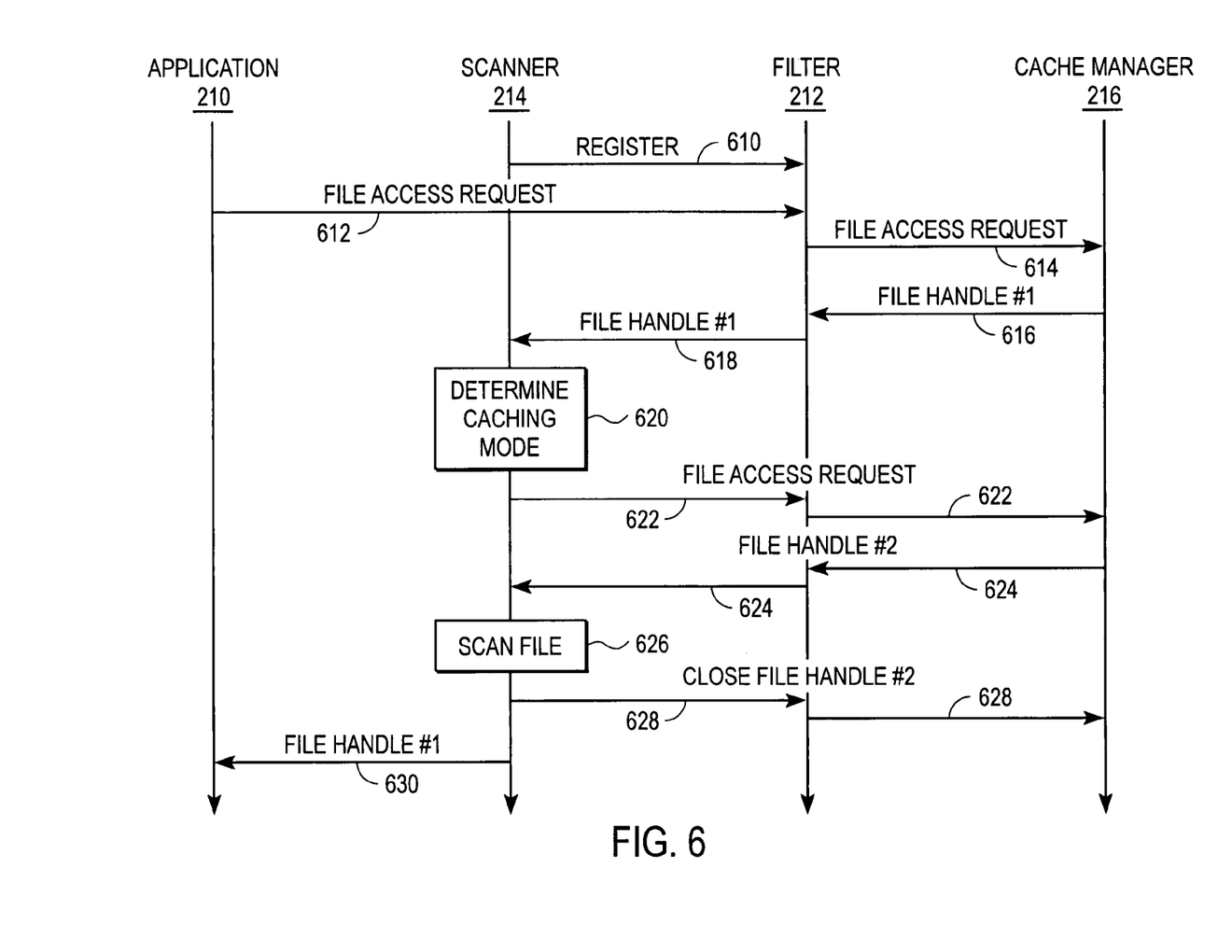

FIGS. 4-6 are ladder diagrams illustrating interactions between the application 210, security scanner module 214, filter module 212, and cache manager 216 according to one embodiment. In the diagrams, time flows from top to bottom, transactions between the entities are represented by horizontal lines, and actions performed by the entities are represented by text boxes. Those of skill in the art will recognize that some embodiments perform different and/or additional transactions and actions than the ones shown in the figures. Moreover, some embodiments perform transactions and/or actions in different orders than the ones described here.

FIGS. 4-6 each illustrate an embodiment wherein the security scanner module 214 intercepts a file access request, alters the caching mode to one optimized for security scanning (if necessary), performs a security scan of the file 220, and resets the caching mode to its original state (if necessary). There are a variety of ways in which these tasks can be accomplished, and FIGS. 4-6 represent three such variations. Other variations will be apparent to those of ordinary skill in the art.

In FIG. 4, the security scanner module 214 registers 410 with the filter module 212 to intercept file handles returned by the cache manager 216. At some point, the application 210 requests 412 access to a file 220. The request either explicitly or implicitly includes a cache hint. The filter module 212 receives this request, and passes 414 it to the cache manager 216. The cache manager 216 opens the file for access and generates a file handle. The cache manager 216 associates a caching mode with the file handle and this mode is usually the one specified by the cache hint. The cache manager 216 returns 416 the file handle to the filter module 212.

Upon receiving the file handle, the filter module 212 determines that the security scanner module 214 has registered for file handles and provides 418 it with the handle. In response, the security scanner module 214 determines 420 whether the caching mode associated with the file handle is optimal for security scanning. If the mode is not optimal, the security scanner module 214 changes the caching mode to the optimal mode. Once the mode is changed, or if no change is necessary, the security scanner module 214 scans 422 the file 220 for the presence of malicious software. If malicious software is found, the security scanner module cleans the file 220, quarantines the file, and/or performs a similar action (such actions are not shown in FIGS. 4-6). Upon completion of the security scan, the security scanner module 214 resets 424 the caching mode to its original state, if necessary, and returns 426 the file handle to the application 210 that initially requested access to the file 220.

In the embodiment of FIG. 5, the security scanner module 214 registers 510 with the filter module 212 to intercept file access requests from applications 210 and file handles returned from the cache manager 216. Eventually, the application 210 issues 512 a file access request, and that request either explicitly or implicitly include a cache hint. The filter module 212 receives this request, and passes 514 it to the security scanner module 214. The security scanner module 214 examines 516 the cache hint in the file access request and determines whether it specifies a mode that is optimal for security scanning. If the mode is not optimal, the security scanner module 214 changes the cache hint so that it specifies the optimal mode.

The security scanner module 214 sends 518 the file access request to the cache manager 216. The cache manager 216 opens the file for access and generates a file handle with the cache mode specified by the cache hint. The cache manager 216 returns 520 the file handle to the filter module 212, and the filter module passes the file handle to the security scanner module 214. The security scanner module 214 uses the file handle to scan 522 the file 220 for the presence of malicious software. Once scanning is performed 522, the security scanner module 214 resets 524 the caching mode to its original state, if necessary. This resetting can be accomplished, for example, by manipulating the cache manager's data structures 218 to change the caching mode associated with the file handle to the one specified by the application's cache hint. The security scanner module 214 returns 526 the file handle to the application 210 that initially requested access to the file 220.

In the embodiment of FIG. 6, the security scanner module 214 registers 610 with the filter module 212 to intercept file handles returned from the cache manager 216. Eventually, the application 210 issues 612 a file access request. The filter module 212 receives this request, and passes 614 it to the cache manager 216. The cache manager 216 opens the file for access and generates a file handle (designated as "file handle #1" in FIG. 6). The cache manager 216 returns 616 the file handle to the filter module 212.

Upon receiving the file handle, the filter module 212 determines that the security scanner module 214 has registered for file handles and provides 618 it with the handle. In response, the security scanner module 214 determines 620 whether the caching mode associated with the file handle is optimal for security scanning. This determination can also be made by examining the file access request from the application 210, as shown in the embodiment of FIG. 5.

If the caching mode is not optimal, the security scanner module 214 issues 622 a new file access request for the same file. This new request contains a cache hint that specifies the optimal mode for security scanning. The cache manager 216 opens the file for access and generates a second file handle (designated as "file handle #2" in FIG. 6). The cache manager 216 returns 624 the second file handle to the security scanner module 214 (via the filter module 212). The security scanner module 214 scans 626 the file 220, using either file handle #1 (if the associated cache hint is optimal), or file handle #2 (if the cache hint associated with the application's original file access request is not optimal). If the security scanner module 214 does not detect malicious software within the file, it closes 628 file handle #2 and/or returns 630 file handle #1 to the application 210.

Thus, the caching mode associated with a file access request is identified. If the caching mode is not optimal for security scanning, the caching mode is changed for the duration of the scan. Then, the caching mode is reset to the mode requested in the original file access request.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for scanning a computer file for malicious software, comprising:
    a computer-readable storage medium storing executable computer program code comprising:
        an interface module for receiving a file access request issued by a process executing on the computer, the file access request having an associated original caching mode;
        a caching mode determination module for determining the original caching mode associated with the file access request; and
        a caching mode alteration module for altering the original caching mode associated with the file access request to an optimal caching mode optimal for scanning the file for malicious software and for resetting the caching mode associated with the file access request to the original caching mode upon completion of the scanning; and
    a processor for executing the computer program code.

2. The system of claim 1, further comprising:
    a filter registration module adapted to register with a filter module executing on the computer to intercept file access requests by the process;
    wherein the interface module is adapted to receive the file access request issued by the process responsive to the registration.

3. The system of claim 2, wherein the file access request received by the interface module includes a cache hint parameter having a value specifying the original caching mode, wherein the caching mode determination module is adapted to determine the value of the cache hint parameter, and wherein the caching mode alteration module is adapted to alter the value of the cache hint parameter.

4. The system of claim 1, further comprising:
    a filter registration module adapted to register with a filter module executing on the computer to intercept file access requests by the process;
    wherein the interface module is adapted to receive a file handle issued in response to the file access request issued by the process, the file handle associated with the original caching mode, and wherein the caching mode determination module is adapted to examine data structures associated with a cache manager executing on the computer system to determine the original caching mode.

5. The system of claim 4, wherein the caching mode alteration module is adapted to alter the data structures associated with the cache manager to alter the caching mode to the optimal caching mode.

6. A computer program product having a computer-readable medium having computer program instructions recorded thereon for scanning a computer file for malicious software, comprising:
    an interface module for receiving a file access request issued by a process executing on the computer, the file access request having an associated original caching mode;
    a caching mode determination module for determining the original caching mode associated with the file access request; and
    a caching mode alteration module for altering the original caching mode associated with the file access request to an optimal caching mode optimal for scanning the file for malicious software and for resetting the caching mode associated with the file access request to the original caching mode upon completion of the scanning.

7. The computer program product of claim 6, further comprising:
    a filter registration module adapted to register with a filter module executing on the computer to intercept file access requests by the process;
    wherein the interface module is adapted to receive the file access request issued by the process responsive to the registration.

8. The computer program product of claim 7, wherein the file access request received by the interface module includes a cache hint parameter having a value specifying the original caching mode, wherein the caching mode determination module is adapted to determine the value of the cache hint parameter, and wherein the caching mode alteration module is adapted to alter the value of the cache hint parameter.

9. The computer program product of claim 6, further comprising:
a filter registration module adapted to register with a filter module executing on the computer to intercept file access requests by the process;
wherein the interface module is adapted to receive a file handle issued in response to the file access request issued by the process, the file handle associated with the original caching mode, and wherein the caching mode determination module is adapted to examine data structures associated with a cache manager executing on the computer system to determine the original caching mode.

10. The computer program product of claim 9, wherein the caching mode alteration module is adapted to alter the data structures associated with the cache manager to alter the caching mode to the optimal caching mode.

11. A computer-implemented method of accessing a computer file, comprising:
using a computer having a processor to perform steps comprising:
intercepting a file access request for the computer file issued by a process executing on the computer, the intercepted file access request having an associated original caching mode;
determining whether the original caching mode associated with the file access request is optimal for scanning the computer file for malicious software; and
responsive to a determination that the original caching mode is not optimal for scanning the file, temporarily changing the caching mode associated with the file access request to an optimal mode for the scanning and resetting the caching mode associated with the file access request to the original caching mode upon completion of the scanning.

12. The computer-implemented method of claim 11, wherein intercepting a file access request comprises:
registering with a filter module executing on the computer to receive the file access requests.

13. The computer-implemented method of claim 11, wherein determining whether the original caching mode associated with the file access request is optimal comprises:
determining a value of a cache hint parameter associated with the file access request.

14. The computer-implemented method of claim 11, wherein a cache manager executing on the computer associates a caching mode with the file access request, and wherein determining whether the original caching mode associated with the file access request is optimal comprises:
examining data structures associated with the cache manager to determine the caching mode associated with the file access request.

15. The computer-implemented method of claim 11, wherein the file access request includes a cache hint parameter having a value specifying a cache mode and wherein temporarily changing the caching mode to an optimal mode for the scanning comprises:
altering the value of the cache hint parameter to specify the optimal caching mode for the scanning.

16. The computer-implemented method of claim 11, wherein a cache manager executing on the computer associates a caching mode with the file access request and wherein temporarily changing the caching mode to an optimal mode for the scanning comprises:
altering data structures associated with the cache manager to associate the optimal caching mode for the scanning with the file access request.

17. A system for accessing a computer file, comprising:
a computer-readable storage medium storing executable computer program code means comprising:
means for intercepting a file access request for the computer file issued by a process executing on the system, the intercepted file access request having an associated original caching mode;
means for determining whether the original caching mode associated with the file access request is optimal for scanning the computer file for malicious software; and
means for temporarily changing the caching mode associated with the file access request from the original caching mode to an optimal caching mode for scanning the file and resetting the caching mode associated with the file access request to the original caching mode upon completion of the scanning responsive to a determination that the original caching mode associated with the file access request is not optimal.

18. The system of claim 4, wherein the caching mode determination module determines that the original caching mode associated with the file access request is not the optimal caching mode and wherein the caching mode alteration module is adapted to issue a new file access request for the file, the new file access request specifying the optimal caching mode.

19. The system of claim 1, wherein the file access request issued by the process includes a cache hint specifying the original caching mode.

* * * * *